(12) United States Patent
Miles et al.

(10) Patent No.: US 7,451,996 B2
(45) Date of Patent: Nov. 18, 2008

(54) UNIVERSAL ADJUSTABLE LIFT/DROP HITCH

(75) Inventors: David M. Miles, Edmond, OK (US); William R. Timmie, Norman, OK (US); Charles S. Steinmetz, Jr., Franklin, TN (US)

(73) Assignee: Scout Technologies, LLC, Norman, OK (US)

( * ) Notice: Subject to any disclaimer, the term of this patent is extended or adjusted under 35 U.S.C. 154(b) by 351 days.

(21) Appl. No.: 11/264,623

(22) Filed: Nov. 1, 2005

(65) Prior Publication Data

US 2007/0096428 A1    May 3, 2007

(51) Int. Cl.
*B60D 1/06* (2006.01)
(52) U.S. Cl. .................... 280/490.1; 280/495
(58) Field of Classification Search ............. 280/490.1, 280/495
See application file for complete search history.

(56) References Cited

U.S. PATENT DOCUMENTS

| | | | |
|---|---|---|---|
| 2,806,710 A | 9/1957 | Mascaro | |
| 2,864,626 A | 12/1958 | Schantz | |
| 3,400,949 A | 9/1968 | Kendall | |
| 3,679,233 A | 7/1972 | Baker et al. | |
| 3,865,406 A | 2/1975 | Dutton | |
| 4,381,069 A * | 4/1983 | Kreck | 224/502 |
| 4,429,895 A * | 2/1984 | Hunter | 280/490.1 |
| 4,662,647 A * | 5/1987 | Calvert | 280/490.1 |
| 5,322,315 A * | 6/1994 | Carsten | 280/479.2 |
| 5,413,366 A | 5/1995 | Gibbons | |
| 5,458,389 A * | 10/1995 | Young | 296/26.08 |
| 5,800,294 A * | 9/1998 | Naecker, Jr. | 473/481 |
| 5,975,553 A * | 11/1999 | Van Vleet | 280/483 |
| 6,502,845 B1 * | 1/2003 | Van Vleet | 280/491.1 |
| 6,575,488 B2 | 6/2003 | Massey | |
| 6,824,156 B2 | 11/2004 | Smith | |
| 6,902,181 B1 | 6/2005 | Dye | |

* cited by examiner

*Primary Examiner*—Kevin Hurley
(74) *Attorney, Agent, or Firm*—David W. Carstens; Carstens & Cahoon, LLP

(57) ABSTRACT

A new and simple hitch assembly comprising a vertically adjustable bar (vertical bar) secured within a mounting sleeve which in turn is securely attached to a hitch bar. A vertical securing pin releasably engages the vertical bar and is maintained in place by a spring, the pin and spring comprising the vertical securing mechanism. The hitch assembly mates with standard hitch receivers such that the relative height of a hitch ball may be varied. The hitch assembly is easy to manufacture and is durable, strong, and stable during towing. Such a hitch assembly is of simple design and has few movable parts. Such a hitch assembly is also compact and has a large range of height adjustment as it is mountable in alternative vertical orientations. The vertical bar has a series of holes in which the vertical securing pin is engaged.

9 Claims, 4 Drawing Sheets

UNIVERSAL ADJUSTABLE LIFT/DROP HITCH

BACKGROUND

1. Technical Field

The present invention generally relates to trailer hitches for connecting a trailing vehicle to a towing car, truck, or other vehicle. The disclosed hitch assembly provides a means for easily adjusting the vertical position of an attached ball hitch with respect to the hitch receiver so as to accommodate a maximum variety of vehicles having a hitch assembly.

2. Description of Related Art

Many people have a need to haul something behind their car or truck. Typically, a trailer or trailing vehicle is coupled to its frame and the towing vehicle with a hitch assembly. The hitch assembly includes a ball hitch that couples to a ball socket on the front of the trailer. A problem occurs when the ball hitch is higher or lower than the ball socket. For instance, a small trailer might sit low to the ground. When towed behind a taller vehicle, the trailer will ride at an angle because the ball socket will have to be tipped upwards to reach the higher ball hitch.

Therefore, a need exists for a hitch assembly that allows the ball hitch to be lowered or raised to roughly match the height for the ball socket. The present invention fills these and other needs as detailed more fully below.

SUMMARY OF THE INVENTION

The object of the present invention is to provide for a new and useful hitch assembly wherein the vertical height of a draw bar with relative to a hitch bar is easily adjustable. A new adjustable hitch assembly mates with standard hitch receivers of vehicles such that the height of a hitch ball relative to a trailor vehicle may be varied. The hitch assembly interoperates with many makes and models of trucks and automobiles. The disclosed hitch assembly is easy to manufacture and is durable, strong, and stable during towing. Such a hitch assembly is of simple design with few movable parts. Such a hitch assembly is also compact and has a large range of height adjustment as it is mountable in alternative vertical orientations.

The adjustable hitch assembly comprises a draw bar mounted to a vertical bar, the vertical bar being slidably mounted inside a mounting sleeve, which sleeve is, in turn, mounted to a hitch bar. The draw bar, vertical bar, mounting sleeve and hitch bar form a simple interlocked device. The hitch bar is secured to a hitch receiving mount by a hitch pin or other connecting mechanism. The vertical bar includes a series of holes through which the vertical position of the vertical bar is secured. A single pin is inserted into one or more of these holes. Such pin is securely maintained in position by a spring or other tension or compression mechanism.

The invention may comprise other structures in combination with the elements of a hitch receiver. A hitch ball may also be provided with the hitch ball being releasably securable to a draw bar.

The invention accordingly comprises the features described more fully below, and the scope of the invention will be indicated in the claims. Further objects of the present invention will become apparent in the following detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

REFERENCE NUMERALS

102 Hitch Bar
104 Vertical Bar
106 Mounting Sleeve
108 Draw Bar
110 Hitch Ball Hole
112 Vertical Securing Mechanism
114 Spring Bar
116 Spring
118 Hitch Pin
120 Safety Catch
122 Vertical Securing Hole
124 Hitch Bar Hole
128 Vertical Securing Pin

DETAILED DESCRIPTION

While the invention is described below with respect to embodiments, and even a preferred embodiment, other embodiments are possible. The concepts disclosed herein apply equally to other devices for providing a vertically adjustable towing hitch.

The present invention is directed to a vertically adjustable hitch assembly that allows for ready manual adjustment of the relative height difference between a hitch receiver and the tongue of a trailing vehicle so that a tractor vehicle and trailing vehicle can be easily and properly coupled. Such a vertically adjustable hitch assembly provides the proper height and connecting orientation for safe towing.

Figure 1:
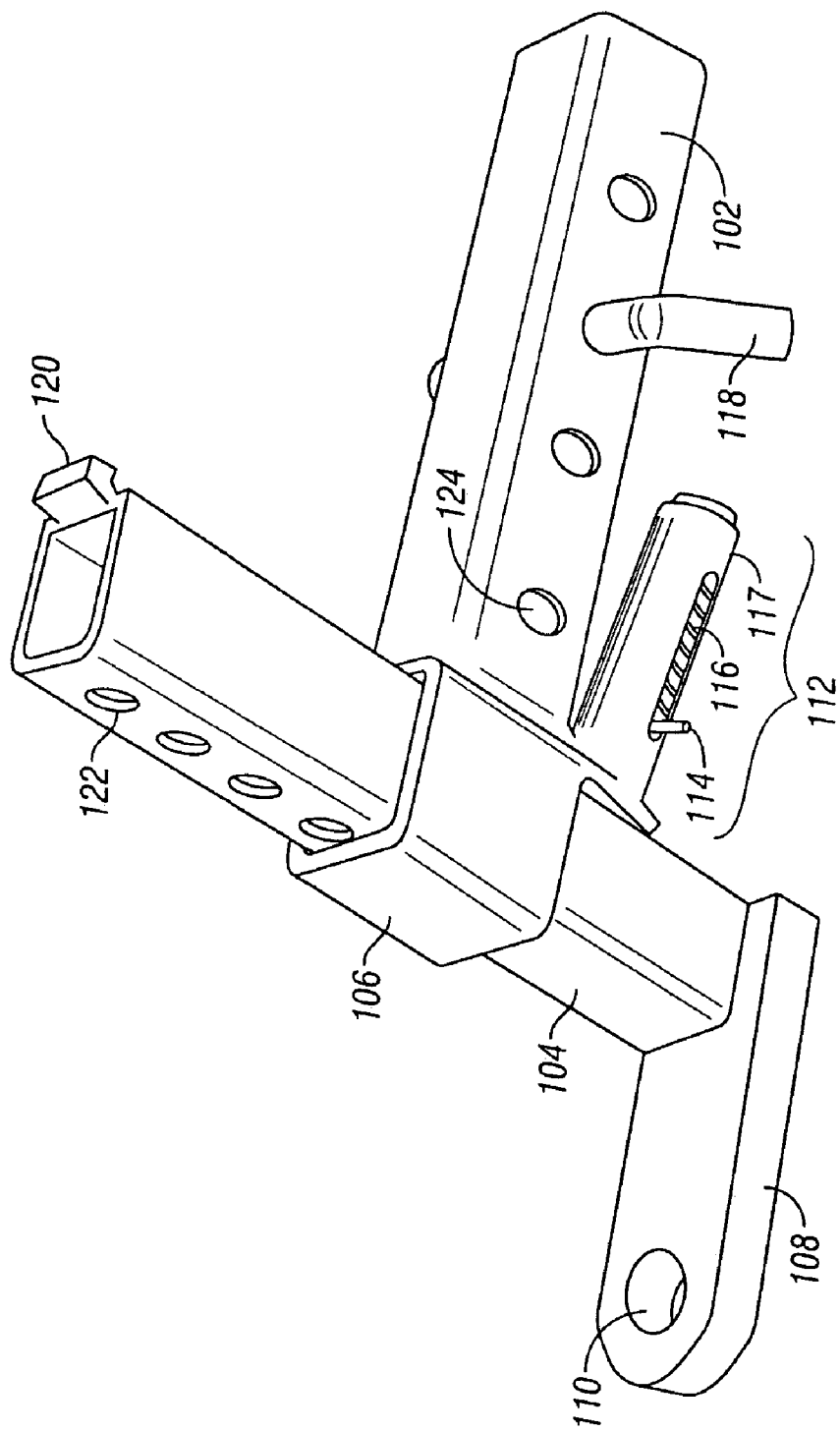
FIG. 1 is a perspective view of one embodiment of a hitch assembly according to the present invention.

FIG. 1 shows a perspective view of one embodiment of the present invention. With reference to FIG. 1, the adjustable hitch assembly comprises a draw bar 108 mounted to a vertical bar 104, the vertical bar 104 being slidably mounted inside a mounting sleeve 106. The mounting sleeve 106 is mounted to a hitch bar 102 which removably fits into a hitch receiving assembly or mount of a tractor vehicle (not shown). The draw bar 108, vertical bar 104, mounting sleeve 106, and hitch bar 102 form a simple interlocked device. Simplicity is advantageous in towing, and especially in the towing rental business.

In one embodiment, the hitch bar 102 is secured to a hitch receiving mount (not shown) by one or more hitch pins 118 or other connecting mechanism. Each hitch pin 118 passes through a hitch bar hole 124 in each side of the hitch bar 102 and corresponding holes in a hitch receiving mount (not shown). In a preferred embodiment, a single hitch pin 118 passes through both sides of the hitch bar 102 so as to provide a simple mechanism to attach the hitch assembly to a hitch receiving mount. In one embodiment, there are multiple sets of hitch bar holes 124 so as to accommodate a variety of desired distances between a hitch mount (not shown) and the tongue of a trailing vehicle (not shown). Such a simple mechanism accommodates a wide variety of vehicles and is simple to operate. Such simplicity provides increased safety and reliability for those renting a hitch assembly, especially to those who may be unfamiliar with towing and towing equipment.

In one embodiment, and with reference to FIG. 1, a vertical bar 104, having a hollow, square cross-section, is slidably coupled to a mounting sleeve 106. The mounting sleeve 106 is permanently attached to the hitch bar 102. The vertical bar 104 may be positioned at various intervals along its length bound only by a draw bar 108 on one end, and an optional safety catch 120 on the other end. In one embodiment, a safety catch 120 is a piece of metal welded to and protruding from the edge of the vertical bar 104 which prevents the vertical bar 104 from exiting the mounting sleeve 106 even when the vertical securing pin 128 is disengaged. Other embodiments of a safety catch 120 are possible including a removable or adjustable element. Such arrangement of the vertical bar 104 provides increased safety to a user during installation and adjustment.

Figure 3:
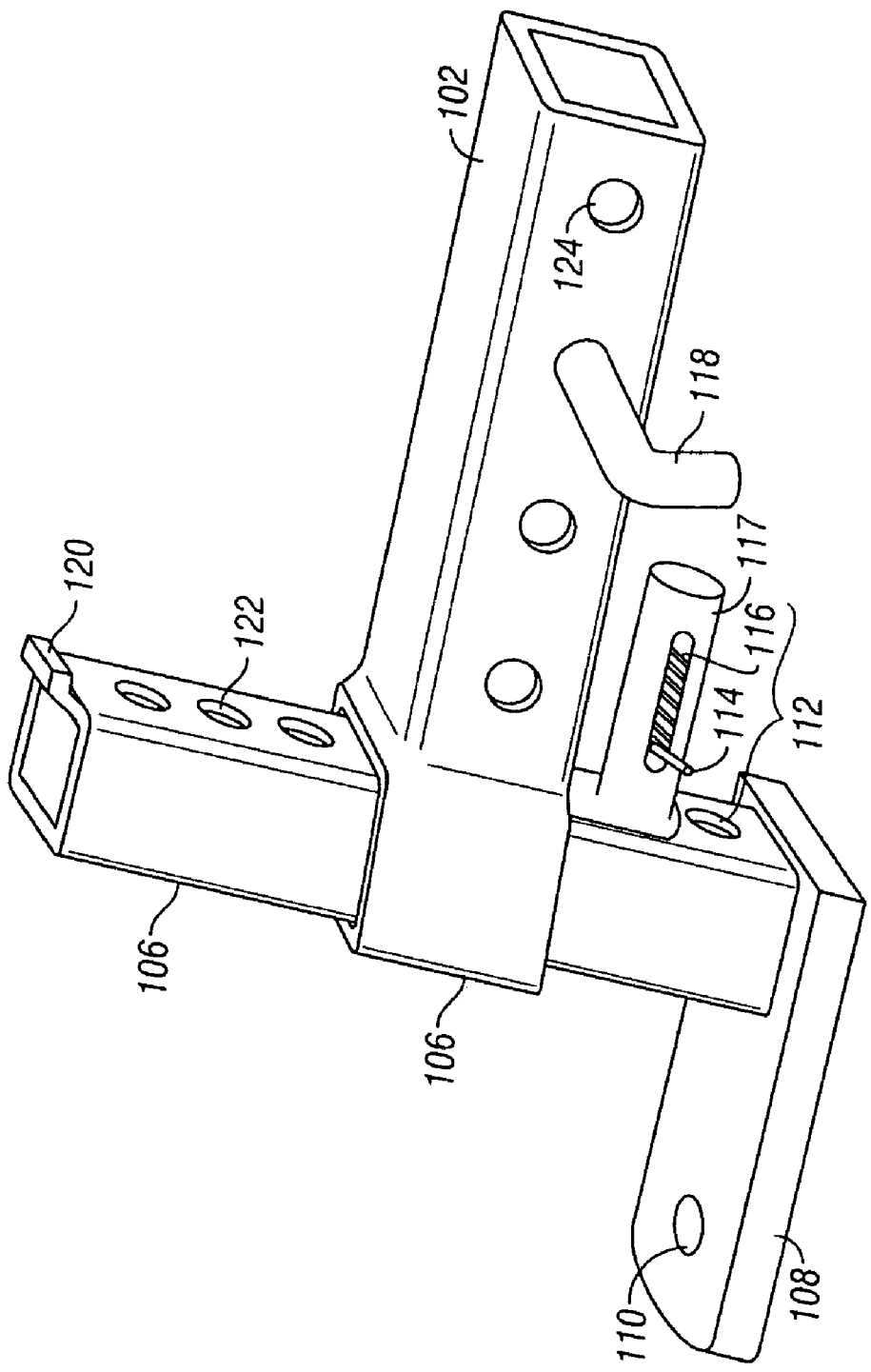
FIG. 3 is a perspective view of the embodiment of the hitch assembly shown in FIG. 1 showing vertical securing holes in the vertical bar; and, FIG. 4 is an overhead perspective view of an alternative embodiment of the hitch assembly according to the present invention.
Figure 4:
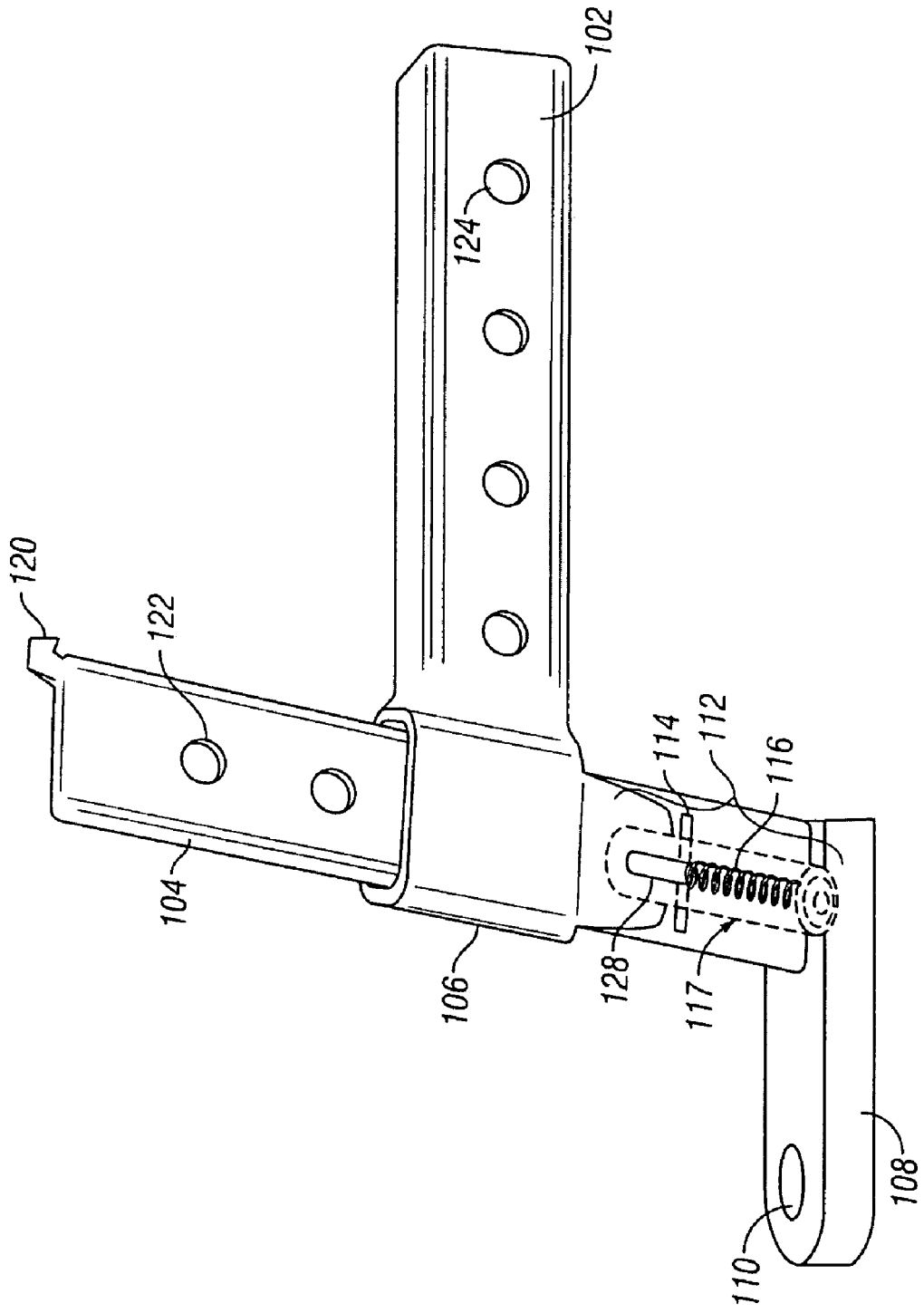

FIG. 3 shows an alternative perspective view of the universal adjustable lift/drop hitch shown in FIG. 1. With reference to FIG. 3, the position of the vertical bar 104 is maintained by engaging a vertical securing pin 128 in one of the vertical securing holes 122 in the vertical bar 104. The vertical securing pin 128 is held in place by a vertical securing mechanism 112 comprising a spring 116 and a spring bar 114 located within the vertical securing mechanism housing 117. Once the vertical securing pin 128 is engaged in a hole 122, the spring 116 maintains a force against the vertical securing pin 128 and prevents it from disengaging. The compression of the spring 116 and the position of the vertical securing pin 128 are bound by a spring bar 114 abutting the housing of the vertical securing mechanism 112. The spring bar 114 provides a gripping surface by which the spring 116 may be manually compressed there by releasing the vertical securing pin 128 from a securing hole 122. 112. The spring bar 114 provides a gripping surface by which the spring 116 may be manually compressed there by releasing the vertical securing pin 128 from a securing hole 122.

The position of the vertical bar 104 may be changed by first compressing the spring 116 thereby allowing the vertical securing pin 128 to slide free from the corresponding vertical securing hole 122. At this point, the vertical bar 104 is free to move along the path defined by the mounting sleeve 106. Once a new vertical position is selected, the vertical securing pin 128 may be re-engaged in a vertical securing hole 122 by releasing the compression on the spring 116.

Other cross-sections for the various hitch assembly members are possible. A square cross-section provides flat surfaces for easy welding or other connecting and assembly means. A square cross-section also provides an advantageous and strong geometry to resist torque forces generated during towing.

Figure 2:
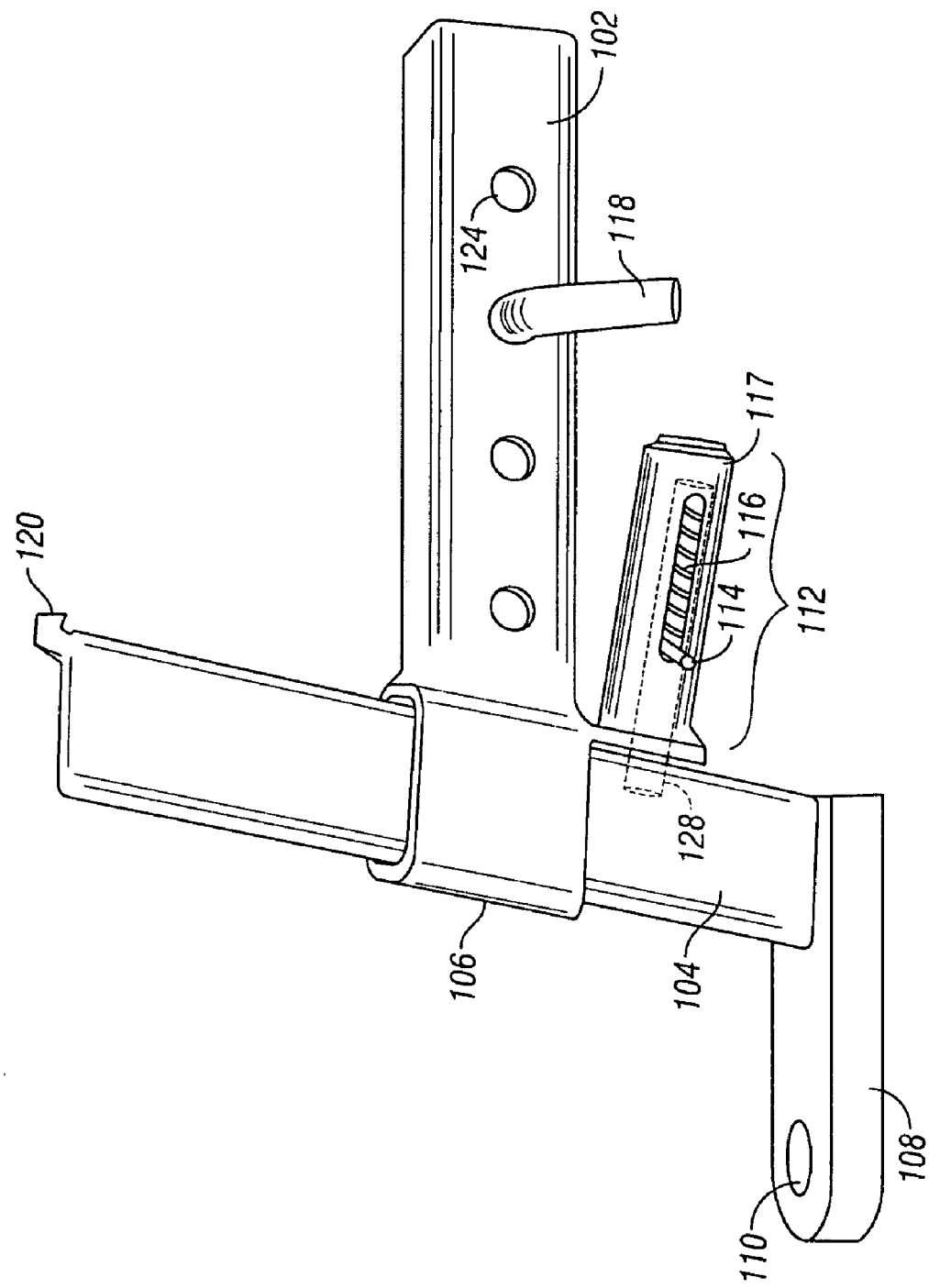
FIG. 2 is a side view of the embodiment of the hitch assembly shown in FIG. 1.

FIG. 2 shows a side view of one embodiment of the hitch assembly according to the present invention. With reference to FIG. 2, the vertical bar 104 and mounting sleeve 106 are mounted in a non-perpendicular arrangement relative to each other. In this arrangement, the vertical bar may not be exactly perpendicular to the horizontal or to the ground. Such arrangement provides an ergonomic benefit in adjusting the vertical position of the vertical bar 104. In this arrangement, the vertical securing mechanism 112 and vertical bar 104 are mounted perpendicularly to each other which allows the vertical securing pin 128 to align properly with vertical securing holes 122 and provides an improved angle relative to the horizontal at which to compress the spring 116. The vertical securing mechanism 112 is not parallel to the horizontal which allows water and other potentially corrosive agents to drain and fall free from it during the securing mechanism housing 117 during towing. To state differently, the housing 117 has a slight negative angle (less than 90 degrees) relative to the hitch bar 102 as shown in this figure. In this embodiment, the draw bar 108 and hitch bar 102 are still maintained in a generally horizontal and parallel orientation for establishing and maintaining proper connection between a trailing vehicle and a tractor vehicle. However, other geometries of these components are possible.

FIG. 2 also illustrates that the entire hitch assembly may be rotated 180 degrees about the hitch bar 102 axis to increase the range of vertical position of the draw bar 108. This is accomplished by removing the hitch pin 118 from the hitch bar hole 124, removing the hitch bar 102 and the entire hitch assembly from the hitch receiving assembly of a tractor vehicle, rotating the entire hitch assembly, and finally repositioning it in the hitch receiving assembly. It would then be necessary to re-insert the hitch pin 118 to secure the hitch assembly to the tractor vehicle. When the draw bar 108 is mounted in the hitch receiving assembly below the hitch bar 102, this position is considered a first position. Similarly, when the draw bar 108 is mounted in the hitch receiving assembly above the hitch bar 102, this position is considered a second position. In the second position, a hitch ball (not shown) would be mounted on the opposite side of the draw bar 108 for coupling of the trailing vehicle to the hitch assembly. Such versatile hitch assembly simultaneously provides a simple apparatus and a relatively large range of vertical adjustment. Such a hitch assembly is released, rotated, and re-attached to a tractor vehicle without the use of tools.

The present invention allows for a quick and easy method to install a hitch assembly to a tractor vehicle, and to change the vertical position of the draw bar 108 of the hitch assembly prior to attaching a trailing vehicle to the tractor vehicle. The method is comprised of the following steps: (1) inserting the hitch assembly into the hitch receiving assembly; (2) inserting the hitch pin 118 through the hitch bar 102 and hitch receiving assembly; (3) compressing the spring 116 of the vertical securing mechanism 112 thereby releasing the vertical securing pin 128 from the vertical bar 104; (4) selecting a desired draw bar 108 height; and (5) re-engaging the vertical securing pin 128 into one of the vertical securing holes in the vertical bar 104. The hitch assembly of the present invention is then ready to receive a trailor vehicle.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted.

We claim:

1. A hitch assembly adaptably and removably secured to a trailing vehicle and a tractor vehicle, comprising:
   (A) a draw bar attached in a generally perpendicular fashion to a vertical bar wherein the vertical bar has a plurality of securing holes for a vertical securing pin;
   (B) a mounting sleeve through which the vertical bar extends longitudinally wherein the mounting sleeve is attached to a hitch bar, wherein the vertical bar is positively retained within the mounting sleeve by a safety catch attached to the end of the vertical bar opposite the draw bar, and wherein the vertical bar is oriented within the mounting sleeve at a positive angle of less than 90 degrees relative to the hitch bar, and wherein the hitch bar may be removably mounted to a hitch receiving assembly of the tractor vehicle in either a first or second vertically oriented position; and,
   (C) a vertical securing pin and spring wherein the vertical securing pin and spring are slidably mounted inside a housing of a securing mechanism, wherein the housing is attached to the mounting sleeve with a negative angle of less than 90 degrees relative to the hitch bar, further wherein the vertical securing pin releasably protrudes into one of a plurality of holes in the vertical bar.

2. The hitch assembly of claim 1 wherein housing of the securing mechanism is mounted perpendicularly to the hitch bar and perpendicularly to the vertical bar.

3. The hitch assembly of claim 1 wherein the hitch bar has a plurality of holes for securing the hitch bar to the hitch receiving assembly of the tractor vehicle.

4. The hitch assembly of claim 1 wherein the draw bar has at least one hole for a hitch ball.

5. The hitch assembly of claim 1 wherein there is exactly one vertical securing pin.

6. The hitch assembly of claim 1 wherein the vertical bar and mounting sleeve each have a rectangular cross section.

7. The hitch assembly of claim 1 wherein the vertical bar and mounting sleeve each have a square cross section.

8. The hitch assembly of claim 1 wherein the vertical bar is mounted at an angle other than perpendicular to the hitch bar.

9. The hitch assembly of claim 1 wherein the vertical bar is bound within the mounting sleeve by a draw bar on one end and by a safety catch on the other end.

* * * * *

UNITED STATES PATENT AND TRADEMARK OFFICE
CERTIFICATE OF CORRECTION

PATENT NO. : 7,451,996 B2 Page 1 of 1
APPLICATION NO. : 11/264623
DATED : November 18, 2008
INVENTOR(S) : David M. Miles It is certified that error appears in the above-identified patent and that said Letters Patent is hereby corrected as shown below:

Column 3, lines 43 through 46, please delete "112. The spring bar 114 provides a gripping surface by which the spring 116 may be manually compressed there by releasing the vertical securing pin 128 from a securing hole 122."

Signed and Sealed this

Third Day of February, 2009

JOHN DOLL
*Acting Director of the United States Patent and Trademark Office*